United States Patent [19]
Lefebvre et al.

[11] Patent Number: 5,130,025
[45] Date of Patent: Jul. 14, 1992

[54] MEMBRANE SEPARATION AND PURIFICATION OF COMPOUNDS

[75] Inventors: Michel S. M. Lefebvre, Double Bay, Australia; Christopher J. D. Fell, Killara, Australia

[73] Assignee: Unisearch Limited, New South Wales, Australia

[21] Appl. No.: 372,094

[22] Filed: Jun. 28, 1989

Related U.S. Application Data

[63] Continuation of Ser. No. 938,337, Dec. 3, 1986, abandoned, which is a continuation of Ser. No. 763,061, Aug. 5, 1985, abandoned, which is a continuation of Ser. No. 569,928, Jan. 11, 1984, abandoned, which is a continuation of Ser. No. 366,671, Apr. 8, 1982, abandoned, which is a continuation of Ser. No. 181,146, Aug. 25, 1980, abandoned, which is a continuation of Ser. No. 951,454, Oct. 16, 1978, abandoned.

[30] Foreign Application Priority Data

Apr. 20, 1978 [AU] Australia .................. PD4134

[51] Int. Cl.$^5$ .............................................. B01D 61/18
[52] U.S. Cl. .................................... 210/638; 210/651; 210/500.38; 264/41
[58] Field of Search ................ 264/41, 44; 427/244, 427/245, 246; 210/638, 640, 644, 651, 652, 654, 500.38, 440, 632; 55/16, 158

[56] References Cited

U.S. PATENT DOCUMENTS

| | | | |
|---|---|---|---|
| 2,422,882 | 6/1947 | Bramley | 55/17 X |
| 3,158,532 | 11/1964 | Pall et al. | 210/505 |
| 3,228,876 | 1/1966 | Mahon | 210/651 |
| 3,400,074 | 9/1968 | Grencl | 210/652 |
| 3,669,879 | 6/1972 | Berriman | 210/652 |
| 3,876,738 | 4/1975 | Marinaccio et al. | 264/44 |

*Primary Examiner*—Frank Spear
*Attorney, Agent, or Firm*—Mason, Fenwick & Lawrence

[57] ABSTRACT

The invention disclosed relates to a new highly permeable anisotropic synthetic membrane useful in membrane separation of compounds in such processes as ultrafiltration, dialysis, electrodialysis, reverse osmosis, gas permeation and gas diffusion. The membrane comprises a multi-layered structure, preferably of 4–12 layers, with each layer thereof serving as a molecular screen of a precise molecular weight cut-off. Between each layer of the membane there are rows of alveolae with adjacent alveolae in adjacent rows being connected by means of channels of molecular dimensions. For any type of plymeric starting material it is possible to obtain membranes of a predetermined molecular weight cut-off. The membranes have the advantage of providing a multilayered action for separation of compounds, with any defect in one layer being corrected by the following layer. For this reason the membranes do not require strict quality control and the cost of manufacture is greatly reduced when compared with membranes of the prior art.

29 Claims, 1 Drawing Sheet

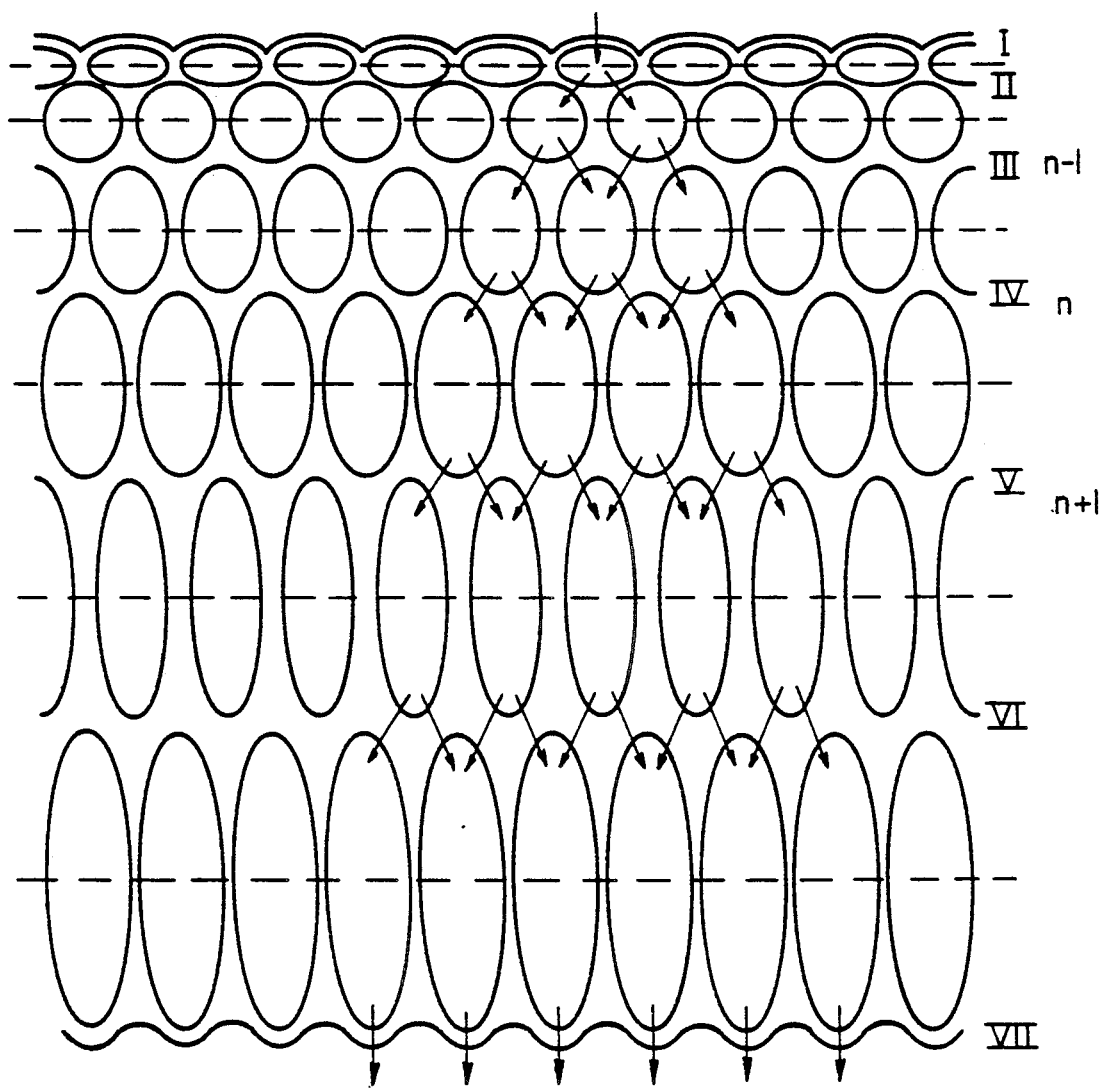

MEMBRANE SEPARATION AND PURIFICATION OF COMPOUNDS

This application is a continuation of application Ser. No. 07/938,337 filed Dec. 3, 1986, which is a continuation of application Ser. No. 763,061, Aug. 5, 1985, which is a continuation of application Ser. No. 569,928 filed Jan. 11, 1984, which was a continuation of application Ser. No. 366,671 filed Apr. 8, 1982, which was a continuation of application Ser. No. 181,146 filed Aug. 25, 1980, which is a continuation of application Ser. No. 951, 454 filed Oct. 16, 1978, all now abandoned.

BACKGROUND OF THE INVENTION

The present invention relates to new highly permeable, synthetic polymeric membranes useful in membrane separations of compounds in such processes as ultrafiltration, dialysis, electrodialysis and reverse osmosis.

Such processes utilize semipermeable membranes which discriminate between solute and solvent molecules on the basis of differences in molecular size, shape, chemical structure or electric charge.

This type of membrane can also be advantageously used in gas permeation and gas diffusion.

Ultrafiltration (UF) is the term applied to the separation of relatively high molecular weight solutes and colloidally dispersed substances from their solvents. The osmotic pressure of the solute is usually negligible and plays no important part in the separation process.

Reverse Osmosis (RO) is the term normally applied to the separation of low molecular weight solutes from their solvent. In this case, the driving pressure for efficient separation must exceed the osmotic pressure of the solution.

In both UF and RO, solution under pressure flows over the surface of a supported membrane, and under the impressed pressure gradient action across the membrane, solvent and certain solute species present pass through the membrane and are collected as permeate. The solvent and solute which are retained by the membrane are referred to as the retentate.

By proper membrane selection it is possible to concentrate, purify and fractionally separate virtually any solution by simple physical means, the sole energy requirement being the compression energy of the feed liquid. This is particularly appealing to manufacturers of thermally and unstable products where traditional separation process, such as evaporation, selective extraction and selective precipitation, often lead to product loss or deterioration.

Membranes commonly used to date for UF are so-called anisotropic membranes, originally developed by S. Loeb and S. Sourirajan at the University of California, Los Angeles in the late 1950's. These membranes are made or "cast" from a solution of a polymer in a solvent (e.g. cellulose acetate dissolved in acetone media). A thin layer of the solution is spread onto a suitable surface, such as a glass plate, and the solvent is allowed to evaporate to the extent that a semi-solid matrix is formed with a skin surface layer, which is due to the fact that the surface layer dries faster than the layers underneath. The membrane is then quenched in another solvent, usually water-based, to rapidly precipitate the remaining polymer; the rapid precipitation or coagulation of polymer forms the sponge like backing of the membrane.

The resultant membrane is an extremely thin layer or film of very fine pore texture polymer ($<5\mu$ thickness) supported by much thicker layer of highly porous material (thickness $>100\mu$). In such membranes only the surface layer or film is active in UF. Further, because the rate of flux through such membranes is low, UF processes utilizing such membranes consume relatively large amounts of energy, are time consuming, and require relative high capital investment in plant or equipment to ensure that use of the membrane is economic or practical, in terms of the rates of flux obtainable from such membranes.

More recently, various types of membrane have been developed using polyelectrolyte, polysulfone and polycarbonate, particularly by such companies as Amicon Corporation and Dow-Oliver (U.S.A.), Sartorius and Gelman (West Germany) and DDS (Denmark). These membranes have either a skin, as described above, or a regular sponge texture. Furthermore, the General Electric Company has developed a technique for manufacturing extremely thin membranes with holes created by nuclear bombardment, and in this case the membranes have a structure which is equivalent to that of a monoscreen. From 1965 to 1970 Du Pont (U.S.A.) and OPI (France) have developed polyamide membranes, either in the flat or the "hollow filter" form. Due to limited permeability and "skinned" properties these membranes where not considered as different in their practical use to classical membranes.

For all prior art membranes, only the surface of the membrane is active and it is purely the property of the active side in contact with the liquid which gives the rejection characteristic of the membrane.

Because of the structure of the prior art membranes, the UF flux is limited in most cases by the formation of a gel layer, external to the membrane, which gel layer is constituted by the species stopped by the membrane. The permeability and cut-off characteristic of the gel layer determine the performance of the membrane. For this reason the flux of permeate through the membrane even at low pressure becomes independent of the pressure drop through the membrane. Further, the flux of permeate is strongly dependent on the wall shear rate, and high flux can only be obtained with the aid of expensive pumping devices to establish a sufficient velocity of fluid in contact with the membrane, to minimise the effect of the gel layer. Furthermore, the flow rate decreases rapidly when the concentration is built up. Because of this effect UF is unattractive or impractical for removal of solvent from highly concentrated solutions.

Another consequence of the structure of the classical prior art membrane is the extremely low rate of flux of membranes having a low molecular weight (M.W.) cut-off. This factor of water permeability is very often the overall limiting factor for membrane use.

Furthermore, the realisation of known types of membranes needs very high manufacturing quality control of the structure of the surface of the membrane which results in high manufacturing costs.

SUMMARY OF THE INVENTION

It is an object of this invention to provide a new type of anisotropic synthetic membrane with a multi-layered structure, preferably of 4–12 layers, with each layer thereof serving as a molecular screen of a precise molecular weight cut-off. The attached drawing illustrates, schematically, a membrane having seven layers, indicated as I to VII, respectively. Any two layers of the membrane, which are parallel to the surface of the membrane, comprise between them an alveolar structure of alveolae of precise dimensions. From the top to the bottom of the membrane each alveola varies in dimensions in relation to the immediate preceding and/or succeeding alveola in terms of a geometric progression, i.e. the average volume of the alveola between the first and second membrane layers is related to the average volume of the alveolae between the second and third membrane layers, and so on, in terms of a geometric progression of rate $r_x$ (see below). When the rate f the geometric progression is greater than one (i.e. $r_x > 1$) the membrane is called a divergent membrane, and when the rate is less than 1 (i.e. $r_x < 1$) the membrane is called a convergent membrane. The rate of this geometric progression may be expressed as follows:

$$r_x = \frac{Vol\ [n, n+1]}{Vol\ [n-1, n]}$$

wherein $n-1$, $n$ and $n+1$ are the sequential numbers of adjacent layers in the membrane proceeding in a direction from the top to the bottom of the membrane, and $Vol[n, n+1]$ is the average volume of the alveolae located between the layer n and the layer $n+1$; Likewise, vol. $[n-1, n]$ is the average volume of the alveolae located between the layer $n-1$ and the layer n.

The measure of this average volume can be obtained by the measure of the water content of each layer. The water content (WC) of the layer n is given by:

$$WC_n = \frac{Wt.\ of\ wet\ layer\ -\ Wt.\ of\ dry\ layer}{Wt.\ of\ wet\ layer}$$

$$r_x \simeq \frac{WC_{n+1}}{WC_n}$$

convergence of the Membrane $C = \frac{1}{r_x}$ $$= \frac{WC_n}{WC_{n+1}}$$

If $C < 1$ membrane is called divergent
If $C > 1$ membrane is called convergent With membranes according to the present invention the logarithm of the Mw cut-off of the different layers varies in geometric progresssion of rate:

$$\rho_x = \frac{\log MW\text{cut-off}_{n+1}}{\log MC\text{cut-off}_n}$$

The molecular convergence of the membrane is defined as $$\gamma = 1/\rho_x$$

If $\gamma > 1$ the membrane is called molecularly convergent.
If $\gamma < 1$ the membrane is called molecularly divergent.
This gives four types of membrane as follows:

| convergent-convergent | c > 1 | γ > 1 |
| convergent-divergent | c > 1 | γ < 1 |
| divergent-convergent | c < 1 | γ > 1 |
| divergent-divergent | c < 1 | γ < 1 |

The membranes according to the present invention are highly permeable relative to previously known anisotropic membranes, due mainly to the intercellular or inter-alveolar structure. This structure is constituted of macromolecules of polymer forming an amorphous polymer net with "holes" or "channels". These channels have a high tortuosity and are slightly and elastically deformable under pressure; or they are created during the coagulation by the reassembly of the macromolecules and leaching of the chemical by-products of the coagulation. The "hole" or "channel" flow area is large, and the rejection characteristics of the membrane are primarily derived from the hindering of, rather than the total obstruction of, the flow of retained species. Thus, the theory and performance of the membranes according to the present invention are quite different from those of previously known anisotropic membranes. By suitable tailoring of the size of the "channels" or "holes", membranes of different throughout and rejection characteristics can be obtained.

Prior art membranes are made from a specific polymer to produce a membrane having known, pre-determined characteristics. According to the present invention it is possible to vary the molecular weight cut-off point and a solvent flux of the polymeric membrane by controlling the depolymerization or repolymerization of the polymeric material by varying the time of maturation of the dope of a given polymer.

For any type of polymeric material it is possible to obtain membranes of a predetermined molecular weight cut-off point (MWCO), and to obtain a complete range of membranes between two extreme cut-off points, i.e. from the case where the coated film of material before coagulation (dope) is not matured at all, to the other extreme with several days of maturation and maximum depolymerization compatible with the stretch of strength of the membrane. The more the mixture to be coated is matured, the higher the permeability of the membrane. Further, the lower the concentration of polymer, the greater is the permeability of the membrane. For a given polymer: The more the dope is matured the higher is the MWCO. The lower the concentration of polymer the higher is the MWCO. Any increase of the polymerization level of the starting polymer, any increase of the order or crystallinity of the polymer leads to lower MWCO.

The multi-layered structure of membranes according to the present invention has the advantage of providing a multi-layered action in terms of separation, with any defect in one layer being corrected by the following layer. For this reason, this type of membrane does not require high or stringent quality control during manufacture. Accordingly, the manufacturing costs of membranes of the present invention, when compared with the cost of manufacture of prior art membranes, is drastically reduced.

Another feature of membranes according to the present invention is the extremely high water content, which can be as high as 98% by weight, which leads to a very high water permeability of membrane.

Another advantage of the membranes of the present invention is the fact that a convergent-convergent membrane is transformed into a divergent-divergent membrane when its orientation of use is reversed. In the same way a convergent-divergent membrane can be transformed into a divergent-covergent membrane. This means that it is only necessary to manufacture two types of membrane, a convergent-convergent membrane and a divergent-convergent membrane, with the orientation of the membrane being determined by the intended mode of use.

All convergent-divergent membranes and divergent-divergent membranes react as "skin" membranes in respect of the formation of a gel layer which means that the gel layer is formed outside the membrane. In this case the classical theories of membranes apply, in terms of the various equations to give the flow rate versus pressure, temperature, shear rate and concentration. In this case the advantage of the membranes according to the present invention is the high water permeability and the low cost.

In the case of both convergent-convergent and divergent-convergent membranes during ultrafiltration, a gel layer, of the species of MW between the MW cut-off of the first layer and the MW cut-off of the last layer, is built up. In this case the membrane acts like a mechanical support of the gel layer and the apparent MW cut-off of the membrane is the MW cut-off of the internal gel layer. This means that there exists the possibility to choose, in a given solution, one of the components or a mixture of components to form this gel layer. Further, it is possible to advantageously choose the components which will give the maximum permeability for the minimum MW cut-off. Any external gel layer built up outside of the membrane is non-adherent to this internal gel layer and is more efficiently removed, for example by laminar or tubulent flow. The permeability of the system begins mostly independently of the concentration. This can be expressed as an internal dynamic membrane effect with the advantage that the compression of the dynamic membrane is avoided because of the internal support given by the membrane, especially in the case of pulsing flow.

Membranes in accordance with the present invention are obtained by the controlled unidirectional coagulation of polymeric material from solution when coated onto a suitable inert surface.

DESCRIPTION OF THE DRAWINGS

FIG. 1 is a schematic illustration of a seven layer membrane produced in accordance with the present invention.

DETAILED DESCRIPTION OF THE INVENTION

To manufacture the member it it necessary to prepare a dope by dissolution of polymer. This so-called dissolution effect is obtained by cutting the hydrogen bonds which link the molecular chain of the polymer together. The solvent used for this effect can by itself have a depolymerization effect on the polymer to realize the depolymerization at a controlled level needed for this process; If not, a chemical additive is used to obtain the desired result. To control the speed of dissolution and the speed of depolymerization, a limited amount of tensio-active agent is added and the temperature is controlled. The uniformity of the reaction is controlled by stirring. The depolymerization level is obtained after a time called the maturation time. The appropriate depolymerization level is determined by viscosity measurement of the dope. The dope is then cast on a glass plate, or any other suitable inert, non-porous support, by the classical technique of knife coating at a controlled thickness. The dope is then coagulated by immediate immersion in a coagulation bath which comprises any chemical product which is capable of dilution of the solution and annealing of the depolymerization compound which has been used. The number of layers comprising the membrane depends upon the thickness of the film before coagulation, and can readily vary from four to forty, although production of more than ten to twelve layers is unusual.

For a given concentration of polymer in the dope there exists an equilibrium between the volume of the dope and the volume of the first layer. This concentration is called neutral concentration and the alveolae in the membrane are of a constant size. The membrane is then called a parallel membrane with convergence $C=1$. For any concentration of polymer in the dope above the neutral concentration the membrane obtained is a divergent membrane which can be seen by the fact that the upper surface of the membrane is bright and the lower surface is dull. For any concentration of polymer lower than the neutral concentration the membrane obtained is a convergent membrane with the upper surface dull and the lower surface bright. Through this normal procedure the cut-off point of the first layer is generally above the cut-off point of the bottom layer. By this process it is possible to obtain convergent-convergent membranes or divergent-convergent membranes which can be used also as divergent-divergent and convergent-divergent membranes, respectively, by reversing the orientation of use of the membrane.

For example consider a polyamide dope comprising Polyamide - 6,6 in a mixture of 50 ml. 10 N HCl, 25 ml. $H_2O$ and 5 ml. $CH_3 CH_2OH$. In this mixture neutral concentration ($C=1$) is achieved by the addition of 27.5 gms. of Polyamide-6,6, and such a dope mixture would provide a parallel membrane. A divergent membrane could be obtained by the addition of 40 gms. of Polyamide-6,6 or a convergent membrane could be obtained by the addition of 17.5 gms, of Polyamide-6,6.

As state above, the coagulation of the coated film of polymeric material on the inert surface is subjected to controlled, unidirectional coagulation, from the uppermost surface of the coated film through to the inert surface. The first layer is directly coagulated, but the second and subsequent layers are coagulated through the coagulation of the immediate previous layer. This creates different conditions of coagulation, in terms of concentration, to cause the formation of different layers of cells of alveolae with the alveolae in each layer having different dimensions to the next adjacent layer of alveolae on either side.

Some of the factors which affect the coagulation of the film of material are: pH, temperature and redox potential.

Take for example membrane based on a polyamide 6 which has a degree of polymerization of about 120. The polymer is dissolved in an acid (HCl, $HNO_3$ or formic acid) and optionally an alcohol (e.g. methyl or ethyl alcohol or glycol), a plasticizer and an inert salt. The variation in molecular weight or the molecular weight cut-off point in the polymeric material of the resultant membrane is determined by the type of acid used. For molecular weights between about 300 and 2000, formic acid can be used; for molecular weights between about 2000 and 80,000 nitric acid can be used; and for molecular weights between about 80,000 and 800,000, hydrochloric acid can be used. To form the membrane, the solution is coated onto a suitable flat inert surface, such as a glass plate, to a thickness of about 100 $\mu$ and then coagulated by an adjustment of the pH by a process involving interfacial contact with a basic solution such as ammonia. Coagulation in the solution coated on the flat surface takes place in stages. The different rates of coagulation produce a multi-layered membrane comprising from about 3 to about 15 layers. As for the micro structure of the coagulated polymer, the diameter of each channel is of the order of 100 Å but can vary between about 20Å and about 1000Å, depending upon the speed of coagulation and the concentration of the salts. The size or diameter of the channels can be adjusted or predetermined by a number of independent parameters including, the nature of the acid used in the initial dissolution of the polymeric material, the concentration of the polymeric material in solution, the pH determined by the concentration of the base, the temperature and the level of added salts. If neither the solution of polymeric material not the coagulation base contain added salt then there is a medium rate of coagulation resulting in channels of medium size in the resulting membrane. If inert salt is added only to the solution of polymer material and not to the coagulation base a higher flux of desorption of salts is obtained resulting in channels of larger diameter. If on the other hand salt is added only to the coagulation bath a very slow rate of coagulation is obtained with resultant smaller diameter channels produced in the membrane. The rate or speed of coagulation can be controlled or modified by addition to the coagulation base of an inert salt of the same ionic system as (or having common ions with) the acid used for the dissolution of the polymeric material. For example if the acid used in HCl then the inert salt additive could be NaCl. Replacement of the sodium ion with a larger ion also has an effect on the rate of coagulation.

Below is given one example of formation of a multi-layered membrane, in accordance with the present invention. It will be appreciated that this example is merely intended to be exemplary of the invention, and in now way limiting upon the scope thereof.

EXAMPLE 100 ml of 10 N HCl is mixed with 50 ml $H_2O$. Then 10 ml of Ethyl alcohol is added to the mixture. In the meantime, 80 gm of Polyamide 6 in finely divided form (20 denier, high drawing ratio, 3 filament, bright yarn) is washed to remove surface oil, dried and weighed. The washed yarn is then dissolved in the previously prepared mixture of HCl, water and alcohol over a period of about 20 minutes, maintaining the temperature below 25° C. This is an exothermic reaction and any overheating could cause an increase in the level of depolymerization of the polymer. The solution is then degasified and matured at 20° C. for 1 days. The matured solution is then coated as a film of about 100μ thickness onto a clean glass plate. The coated plate is then carefully placed into a water bath to coagulate the film of polymeric material on the glass. The coagulation reaction is completed in about two minutes, and the membrane floats free of the glass plate. The membrane is recovered from the coagulation bath, washed in hot water (90° C. for 30 seconds) to remove monomer and salts e.g. $Cl^-$ ions and to anneal the membrane, and is then removed and dried. This membrane has a water permeability of $200 l/m^2/H$.

By use of different polymers, different coagulation procedures and different implanted ions it is possible to obtain membranes having different properties.

The enclosed drawing illustrates schematically the cross-sectional structure of membrane according to the present invention. This structure has been validated by both transmission and scanning electron microscopes. Cell or alveolar walls are of the order of 1-2 μm thick, with the shape of cells or alveolae varying away from the leading surface, i.e. the size of cells in each layer increases from the top or leading surface to the bottom or trailing surface of the membrane. Electron micrographs show that the ratio of minor to major semi-axes of the cells (considered as prolate spheroids) varies in the approximate geometric progression with distance from the membrane surface. The connecting channels between cells in adjacent layers are not illustrated. These channels are aligned normally to the membrane surface, and to pass from one cell to the next and subsequently through the membrane, a molecule or ion follows a path from a cell in the leading surface layer to adjacent cells in the following layers with negligible lateral transfer between cells.

The separation of compounds by means of the use of membranes according to the present invention is the result of separate phenomena depending on the separation being effected i.e. dialysis, ultrafiltration, reverse osmosis, etc.

In dialysis the membranes according to the present invention are useful as a screen even for very small molecules which, because of their random zig-zag movement through their solvent, have a means free path, the amplitude of which is greater than the diameter of the molecular channels between cells of the membrane.

For example, a UF membrane, in accordance with the present invention, having a M.W. cut-off point of 500,000 may have molecular channels of 100 Å diameter. A small molecule of M.W. 200 and means diameter of 7 Å may have a mean free path of amplitude 300 Å and therefore is severely hindered in passing through the molecular channels. Thus the same membrane which is used in UF to separate or enrich molecules of MW 500,000 can also be used in dialysis to purify molecules of MW 100-200.

As indicated above, the membranes according to the present invention are useful in membrane separation of compounds in such processes as dialysis, electrodialysis, gas permeation, gas diffusion, ultrafiltration and reverse osmosis. A discussion of these various processes and specific applications of the membranes follows.

DIALYSIS

In dialysis processes the membrane is used as a barrier between two compartments, one compartment filled with solvent and solute the other compartment being filled with solvent only. The exchange between the two compartments through the membrane is driven by the concentration gradient which exists between the two faces of the membrane. The separation of various solutes through the membrane is influenced by the size of the molecular and the mean free path.

Used as a dialysis membrane, and using the membrane to separate $Cu^{++}$ and $Co^{++}$ ions from a mixture of $CuCl_2$ and $CoCl_2$ in water, it is possible to enrich the $Co^{++}$ concentration by 130% in one stage; that such a level of enrichment can be achieved with a membrane according to the present invention is strongly indicative that each layer of the membrane is active in the enrichment process, giving a multi-stage enrichment effect in one pass through the membrane.

If the membrane is used as a divergent membrane the level of dilution from the small alveolae side to the largo alveolae side is constant step by step, such that there is a multi-layered separation with each layer effecting an optimum degree of separation.

IMMOBILISED ENZYME TECHNOLOGY

An interesting possibility given by polyamide membrane is the possibility of fixation of enzyme with two different modes of fixation.

1. Fixation by adsorption of enzyme linked to a plasticizer of the membrane. In fact water as a plasticizer of the membranes helps in the adsorption to the membrane of any hydrated enzyme.

2. Fixation by hydrogen bonding to the oxygen. in the

group of the polyamide. The amino group in the enzyme provides the basis for an enzyme-polyamide hydrogen bonding. This leads the possibility of fixation of a high quantity of enzyme, e.g. it is possible to fixed 35% by weight of α-amylase onto the polyamide-6,6-membrane. The use of this membrane in UF permits an enzyme transformation of a compound during its passage through the membrane e.g. to remove lactose and galactose from milk during U.F.

Electrodialysis

It is possible to modify the polarity of the membrane and to obtain anionic, neutral or cationic membranes, e.g. a membrane formed from a dope containing HCl has a strong electrovalent fixation of chloride inside the polymer and has the characteristics of a strongly electro-negative membrane. By chemical annealing of this membrane, e.g. treatment with 5N $CH_3COOH$ for 1 minute and washing with water, it is possible to replace the chlorine site by solvated water in the reaction of hydrolysis of the polymer; In this case the membrane is transformed into a neutral membrane. In the same way, it is possible to obtain electro-positively charged membranes by chemical annealing of the membrane by strong hydroxides.

The advantage of the membrane according to the invention in electro-dialysis is mainly due to the extremely high water content of the membrane which leads to high permeability and low potential drop.

GAS FERMEATION

In this application the membrane is used to make a separation between different liquid components or separation between a liquid-gas two-phase system.

e.g. 1. The membrane can be used for separation of n-propane and iso-propane. The liquid mixture under pressure is gasified through the membrane by a constant supply of heat on the other side of the membrane. The speed of transfer of the iso-propane through the membrane is greater than that of the n-propane and the liquid phase is enriched in n-propane.

e.g. 2. For the recovery of liquid fuel from wet natural gas, some types of the membrane (e.g a highly hydrated polymer) allow the gas fraction to pass through the membrane but retain the liquid fraction in the form of droplets which cannot enter the membrane because of the water repellant property of the membrane.

GAS DIFFUSION

The membrane is dry form can be calendered to create a diffusion barrier with extremely thin pore structure from e.g. >15 Å. which permits good selectivity for low MW gas.

ISOTOPIC SEPARATION

Membranes according to the present invention are useful in the separation or enrichment of compounds of different molecular weight, including compounds of heavy metal isotopes, such as isotopes of Actinide elements, and especially isotope of Uranium.

Isotope separation methods depend for their operation on either small physical (i.e. mass) differences, or on the slight chemical different which exist between isotopes. The separation processes usually depend on a very large number of stages, each of which produces only a light isotope enrichment.

Membranes of the type herein described provide the basis for a new enrichment technology for separation and enrichment of isotopes of heavy metals, especially the isotopes of Uranium. Unlike existing processes, it is carried out in the liquid phase rather than the vapour phase. A solution containing isotopes of uranium is subjected to a mild centrifugal force field, whilst at the same time it is caused to flow radially inwards through a membrane of the type herein described, the channels of which serve to partly separate and immobilize the heavier isotope. By largely preventing the molecular back diffusion which limits the effectiveness of the conventional centrifuge, a significant separation can be obtained in each contacting stage. Moreover, as the membrane is relatively permeable compared with the porous membrane used in the gas diffusion process, the flus of enriched material leaving the contacting stage is quite high, despite the fact that a liquid is being processed.

ULTRAFILTRATION

Some specific applications of membranes according to the present invention include:

1) Treatment of waste water or effluent

Treatment of waste water or effluent to reduce effluent volume, to allow water free of major contaminants to be recycled, and to allow products to be recovered from the retentate. Conventional sewage treatment employs a combination of large setting tanks, bacterial cultures and sludge thickening devices to decontaminate waste water and to concentrate the solid residue. Whilst primary treatment for recovery of settable solids is still required, the present secondary treatment can be replaced by ultrafiltration, utilizing membranes according to the present invention. Solids thus filtered from the stream of effluent can thus be concentrated, thus facilitating recycling or disposal thereof.

2) Treatment of tannery effluent

Treatment of tannery effluent to minimize tannery odour and effluent nuisance from disposal of such effluent in municipal sewerage systems.

3) Recovery of surfactants

Recovery of surfactants and other like macromolecular agglomerates from aqueous effluent to enable the surfactants to be recovered and the water to be recycled.

4) Recovery of food industry wastes

Recovery of food industry wastes in the manufacture and refining of food waste liquids and by-products are produced that contain large quantities of nutrients, but in concentrations too low to make their recovery economically practical. However, if the liquids are simply discarded they can cause severe pollution problems. Examples include dairy whey and waste effluents from the extraction of protein from soybean meal and wet milling of corn. By the use of membranes of the present invention, it is possible to concentrate and recover valuable products from such effluents.

Other uses includes the use of membranes according to the present invention for the bio-filtration and sterilization of beverages, including beer, wine and non-alcoholic beverages.

5) The production of recovery of protein from animal blood

The production or recovery of protein from animal blood obtained from abattoirs. The whole blood can be readily fractionated using membranes of this invention to recover the plasma. The plasma in turn may be concentrated prior to drying by further UP technology using another type of membrane corresponding to the invention.

6) Purification and sterilization of water

In this application membranes of relatively large channel diameter are used and the dimensions of the channel chosen varies from one membrane type to another, (from 0.2 to 1.5μ). Bacteria and viruses are stopped according to their dimensions or the dimension of the solid particles to which they may be attached. The membrane acts as a biological screen and can give a flux several times higher than obtainable from the prior art membranes.

In fact, any chemical process which involves the following can effectively use membranes in accordance with the present invention:

a) The removal and recovery of small amounts of dissolved or colloidally dispersed substances from solution;

b) The concentration of solutions or dispersions of valuable products which are thermally or chemically unstable or volatile; and c) The separation and purification of macromolecular or colloidal solutes from solutions which contain micromolecular impurities.

Although the invention has been described above with reference to preferred embodiments, specific examples and drawings, it will be appreciated that numerous variations, modifications or alternatives may be substituted for specifically described features, without departing from the spirit or scope of the invention as otherwise generally described.

We claim:

1. A process for preparing a synthetic membrane having unidirectional controlled graded porosity and a predetermined molecular weight cut-off point, said process comprising the steps of:

a) providing a polymeric material, b) dissolving or dispersing said polymeric material in a solution, said solution containing an acid, said acid capable of dissolving and depolymerizing said polymeric material at a desired temperature, the concentration of said polymeric material and said acid in said solution being selected so as to provide a predetermined rate and degree of depolymerization c) maturing said solution of said polymeric material until said polymeric material has undergone a predetermined degree of depolymerization, d) coating a thin layer of the matured solution onto an inert surface, and e) producing from said thin layer of matured solution a membrane having controlled graded porosity with alveolae of converging or diverging dimensions from one surface to another and a predetermined molecular weight cut-off by during said thin layer by immersing said layer into a bath with only one surface thereof exposed to said bath until said polymeric material is substantially cured, said bath containing a compound capable of curing said depolymerized compound, wherein the polymer is polyamide 6 or polyamide 6,6, and said molecular weight cut-off point is between 80,000 and 800,000 when said acid is hydrochloric acid, said molecular weight cut-off point is between 200 and 80,000 when said acid is nitric acid, and said molecular weight cut-off point is between 300 and 2000 when said acid is formic acid.

2. A process according to claim 1, wherein the rate of said dissolving or dispensing is controlled by addition of tension-active agent and temperature regulation.

3. A process according to claim 1, wherein coagulation is effected by interfacial contact with a basic solution.

4. A process according to claim 3, wherein said basic solution contains an inert salt of the same ionic system as the acid used for the dissolution of polymer.

5. A process according to claim 1, wherein the solution of polymeric material contains an inert salt of the same ionic system as the acid used for dissolution of polymer.

6. An anisotropic synthetic membrane whenever prepared by the process of claim 1.

7. A process according to claim 1 wherein the speed of coagulating is controlled by the addition of an inert salt of the same ionic system as the acid used for dissolution of polymer.

8. A process according to claim 1 wherein each alveola varies in dimension to the immediate preceding and succeeding alveola by a geometric progression.

9. A process according to claim 1, wherein said process further comprises the step of performing dialysis with said membrane.

10. A process according to claim 1, wherein said process further comprises the step of performing immobilized enzyme technology with said membrane.

11. A process according to claim 1, wherein said process further comprises the step of performing electrodialysis with said membrane.

12. A process according to claim 1, wherein said process further comprises the step of separating a gaseous phase from a liquid phase by permeating said gaseous phase through said membrane.

13. A process according to claim 1, wherein said process further comprises the step of calendaring said membrane to create a diffusion barrier.

14. A process according to claim 1, wherein said process further comprises the step of performing isotopic separation with said membrane.

15. A process according to claim 1, wherein said process further comprises the step of performing ultrafiltration with said membrane.

16. A process for preparing a synthetic membrane having controlled graded porosity and a predetermined molecular weight cut-off point, said process comprising the steps of:

a) dissolving polymeric material in an acid solution capable of depolymerizing said polymer and of providing a predetermined degree of depolymerization, b) controlling the rate of dissolution and depolymerization of said polymeric material by addition of a tension-active agent and temperature regulation, c) maturing the solution of said polymeric material until said polymeric material has depolymerized to a predetermined degree, d) coating a thin layer of the matured solution onto an inert surface, and e) curing said thin layer by interfacial contact of only one surface thereof with a solution capable of curing the depolymerized compound, thereby producing a membrane having controlled graded porosity with alveolae of converging or diverging dimensions from one surface to the other, and having a predetermined molecular weight cut-off point, wherein the polymer is a polyamide 6 or polyamide 6,6, and molecular weight cut-off point is between 80,000 and 800,000 when said acid is hydrochloric acid, said molecular weight cut-off point is between 2000 and 80,000 when said acid is nitric acid, and said molecular weight cut-off point is between 300 and 2000 when said acid is formic acid.

17. A process according to claim 16, wherein the solution of polymeric material contains an inert salt of the same ionic system as the acid used for dissolution of polymer.

18. A process according to claim 16, wherein coagulation is effected by interfacial contact with a basic solution containing an inert salt of the same ionic system as the acid used for the dissolution of polymer.

19. An anisotropic synthetic membrane whenever prepared by a process of claim 16.

20. A process according to claim 16 wherein each alveola varies in dimension to the immediate preceding and succeeding alveola by a geometric progression.

21. A process according to claim 16, wherein said process further comprises the step of performing dialysis with said membrane.

22. A process according to claim 16, wherein said process further comprises the step of performing immobilized enzyme technology with said membrane.

23. A process according to claim 16, wherein said process further comprises the step of performing electrodialysis with said membrane.

24. A process according to claim 16, wherein said process further comprises the step of separating a gaseous phase from a liquid phase by permeating said gaseous phase through said membrane.

25. A process according to claim 16, wherein said process further comprises the step of calendaring said membrane to create a diffusion barrier.

26. A process according to claim 16, wherein said process further comprises the step of performing isotopic separation with said membrane.

27. A process according to claim 16, wherein said process further comprises the step of performing ultrafiltration with said membrane.

28. A process for preparing a synthetic membrane having unidirectional controlled graded porosity and a predetermined molecular weight cut-off point, said process comprising the steps of:

a) providing a polymeric material, b) dissolving or dispersing said polymeric material in a solution, said solution containing an acid, said acid capable of dissolving and depolymerizing said polymeric material at a desired temperature, the concentration of said polymeric material and said acid in said solution being selected so as to provide a predetermined rate and degree of depolymerization c) maturing said solution of said polymeric material until said polymeric material has undergone a predetermined degree of depolymerization, d) coating a thin layer of the matured solution onto an inert surface, and e) producing from said thin layer of matured solution a membrane having controlled graded porosity with alveolae of converging or diverging dimensions from one surface to another and a predetermined molecular weight cut-off by curing said thin layer by immersing said layer into a bath with only one surface thereof exposed to said bath until said polymeric material is substantially cured, said bath containing a compound capable of curing said depolymerized compound, wherein said acid is selected from the group consisting of:

HCl and HNO$_3$.

29. A process for preparing a synthetic membrane having controlled graded porosity and a predetermined molecular weight cut-off point, said process comprising the steps of:

a) dissolving polymeric material in an acid solution capable of depolymerizing said polymer and of providing a predetermined degree of depolymerization, b) controlling the rate of dissolution and depolymerization of said polymeric material by addition of a tensio-active agent and temperature regulation, c) maturing the solution of said polymeric material until said polymeric material has depolymerized to a predetermined degree, d) coating a thin layer of the matured solution onto an inert surface, and e) curing said thin layer by interfacial contact of only one surface thereof with a solution capable of curing the depolymerized compound, thereby producing a membrane having controlled graded porosity with alveolae of converging or diverging dimensions from one surface to the other, and having a predetermined molecular weight cut-off point, wherein said acid is selected from the group consisting of:

HCl and HNO$_3$.

* * * * *